United States Patent [19]

Schmidle

[11] 4,200,762
[45] Apr. 29, 1980

[54] ACTINIC RADIATION CURABLE POLYMERS

[75] Inventor: Claude J. Schmidle, Trenton, N.J.

[73] Assignee: Thiokol Corporation, Newtown, Pa.

[21] Appl. No.: 939,034

[22] Filed: Sep. 1, 1978

Related U.S. Application Data

[62] Division of Ser. No. 736,922, Oct. 29, 1976, abandoned.

[51] Int. Cl.$^2$ .................... C07C 125/04; C08F 8/00
[52] U.S. Cl. .................... 560/26; 204/159.14; 204/159.15; 204/159.18; 204/159.23; 204/159.24; 204/159.19; 427/44; 427/54.1; 528/75; 528/45
[58] Field of Search .................... 560/26

[56] References Cited

U.S. PATENT DOCUMENTS

| | | | |
|---|---|---|---|
| 3,231,597 | 1/1966 | Fischer | 560/26 |
| 3,297,745 | 1/1967 | Fekete et al. | 560/26 |
| 4,013,806 | 3/1977 | Volkert et al. | 427/54 |
| 4,035,320 | 7/1977 | Lawson | 427/54 X |
| 4,065,627 | 12/1977 | Harrison | 560/26 |

FOREIGN PATENT DOCUMENTS 1415883 12/1975 United Kingdom .................... 560/26

*Primary Examiner*—Howard T. Mars
*Assistant Examiner*—G. T. Breitenstein
*Attorney, Agent, or Firm*—Stanley A. Marcus; Royal E. Bright

[57] ABSTRACT

Prepolymers having at least one functional group capable of absorbing actinic radiation resulting in electronic excitation of the molecule, leading to free radical type cure of systems containing these prepolymers and prepolymers capable of curing by a free radical mechanism are disclosed.

4 Claims, No Drawings

ACTINIC RADIATION CURABLE POLYMERS

This is a division of application Ser. No. 736,922 filed, now abandoned.

BACKGROUND OF THE INVENTION

The initiation of cures of polymeric systems either with peroxides or actinic radiation has long been known to the macromolecular art. Some macromolecules, noteably those containing chlorine, can undergo cure directly with actinic radiation. Irradiation of this type molecule with ultraviolet or violet light causes the chlorine-carbon bond in the molecule to break resulting in loss of chlorine and induction of a free radical on the molecular skelton. Because most of the prepolymers and monomers used when a radiation cure is desired are relatively poor absorbers of radiation in the violet and near ultraviolet regions of the radiation spectrum, it is common to use a radiation cure accelerator. These radiation cure accelerators, which usually up to the present have been relatively low molecular weight compounds, are efficient absorbers of light in the violet and ultraviolet regions. When this radiation is absorbed electrons are promoted to higher energy levels in the molecule. This energy is then transferred to the monomer or prepolymeric oligomers which it is desired to cure. This procedure greatly increases the efficiency of utilization of incident radiation energy and renders the process practical.

The use of these radiation cure accelerators is attended by certain inherent problems. Being relatively low molecular weight compounds, they tend to bleed out of a system in which they are incorporated both before and after cure. This results in lack of shelf stability for materials preformulated for later cure and manifestly is undesirable in the finished product. In addition, while aiding in and initiating cure these compounds do not actually enter into the cure reaction. They remain as low molecular weight inclusions in the cured polymer. Their presence thus reduces the maximum physical properties obtainable in the cured system. Such properties as hardness, abrasion resistance, extensibility and even flexibility are all adversely affected. U.S. Pat. No. 3,661,744 does suggest that the photo cure rate accelerator may be chemically combined with one of the reactive structures in the system to be cured but the illustration given thereof is of a benzophenone combined with a number of monomeric units.

The novel compositions of the present invention provide oligomeric prepolymers which are themselves good absorbers of actinic radiation and which therefore do not require the presence of a separate radiation cure accelerator in the system. These compounds are also relatively high molecular weight radiation cure accelerators which enter into the curing reaction.

SUMMARY OF THE INVENTION

The invention provides as a composition aspect a chemical compound which is an oligomeric prepolymer having appended thereto at least one functional group capable of absorbing actinic radiation thereby inducing electronic excitation in said compound.

Examination of the products produced by the herein described processes reveals, upon infrared analysis, spectral data supporting the molecular structure herein set forth.

The tangible embodiments of this composition aspect of the invention possess the inherent applied use characteristics of initiating cures of polymeric system containing them, while participating in the polymerization reaction themselves.

A preferred embodiment of this composition aspect of the invention provides a chemical compound of formula $$[X-A]_n R \qquad \qquad I$$

wherein

R is the residue of an oligomer derived by removal of an active hydrogen or a halo atom from said oligomer which has been terminated with hydroxyl, carboxyl, halo or amine functions, the monomeric units of said oligomer being linked by ester, ether, urethane, silane, amide, sulfide, covalent carbon to carbon bond functions, or mixtures thereof; said monomeric units exclusive of the atoms attributable to said linkage functions being derived from alkanes, alkenes, phenylene, naphthylene or mixtures thereof;

A is

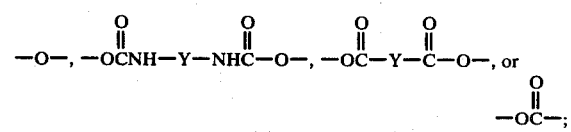

wherein Y is cycloalkylene of 5 to 7 carbon atoms, or carbocyclic arylene of 6 or 10 carbon atoms; X is selected from alpha-, or beta-naphthoxy, 2-, 3-, or 4- phenyl carbonyl phenyleneoxy, 2-, 3-, or 4- lower alkyl carbonylphenyleneoxy, or

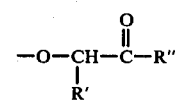

wherein R' and R" are independently selected from phenyl, alpha-, or beta-naphthyl, 2-, 3-, or 4- pyridyl, alpha-, or beta-furyl; said naphthoxy and naphthyl radicals being unsubstituted or substituted with radicals, identical or mixed, selected from up to 6 straight chain lower alkyl of from 1 to about 8 carbon atoms, up to 5 non all adjacent branched chain lower alkyl radicals of from 1 to about 8 carbon atoms, up to about 6 lower alkyloxy of from 1 to about 8 carbon atoms, up to 6 halo, up to 3 non-adjacent trifluoromethyl, up to 3 non-adjacent trichloromethyl, methylenedioxy, dilower alkyl amino of from 1 to 8 carbon atoms, or lower alkanoylamido of from 1 to 8 carbon atoms; said phenyl and phenylene radicals being unsubstituted or substituted with radicals, identical or mixed, selected from up to 4 straight chain lower alkyl of from 1 to about 8 carbon atoms, up to 3 non-adjacent branched chain lower alkyl of from 1 to about 8 carbon atoms, up to 4 lower alkyloxy of from 1 to about 8 carbon atoms, up to 4 halo, up to 2 non-adjacent trifluoromethyl, up to 2 non-adjacent trichloromethyl, methylenedioxy, dilower alkyl amino of from 1 to about 8 carbon atoms, or lower alkanoylamido of from 1 to about 8 carbon atoms; said pyridyl and furyl radicals being unsubstituted or substituted with up to 2 lower alkyl of from 1 to about 8 carbon atoms; and n is on the average at least 0.5.

Particularly preferred embodiments are:

1. Those compounds of Formula I which absorb actinic radiation in the wave length region of from about 3000 Angstroms to about 4000 Angstroms.

2. Compounds of Formula I wherein the residue R is derived from a hydroxy terminated polyester, or a hydroxy terminated polyether. Still more particularly preferred are those compounds of Formula I wherein the hydroxy terminated polyester or polyether is capped with a diisocyanate. Special mention is made of compounds of this type wherein the diisocyanate capped hydroxy terminated polyester is reacted with a benzoin.

3. Compounds of Formula I wherein the residue R is derived from a polyester or polyether and additionally contains a residue derived from a hydroxy acrylate ester or from an isopropylidine hydroxy derivative.

The invention also provides in another composition aspect an actinic radiation curable composition of matter which comprises:

a. an oligomeric prepolymer having at least one functional group capable of absorbing actinic radiation thereby inducing electronic excitation in said compound; and, b. a prepolymer having at least one carbon to carbon unsaturated bond in a terminal position.

The tangible embodiments of this composition aspect of the invention possess the inherent applied use characteristics of being curable to a substantially solid polymer upon exposure to actinic radiation.

Preferred embodiments of this composition aspect of the invention are 1. a composition of matter which comprises:
a. a compound of Formula I; and,
b. a compound of the formula

$$[Z-A]_{\overline{m}}R \qquad \text{II}$$

wherein R and A are as defined for Formula I; m is on the average at least 1; and Z is a residue derived from a hydroxy containing acrylate ester, or a hydroxy containing derivative of a vinyl ether.

Particularly preferred aspects of this preferred embodiment are those compositions wherein R has a polyether or polyester backbone, is terminated with an isocyanate and is end capped on another terminal position with a benzoin. Also particularly preferred are those compositions wherein the compound of Formula II has a polyether or polyester backbone, is terminated with an isocyanate and is end-capped with an acrylate function.

The invention also provides in a process aspect an improved process for preparing an article coated with a cured film derived from a radiation curable coating applied to said article wherein the improvement comprises applying to said article a coating comprising:

a. an oligomeric prepolymer containing at least one functional group capable of absorbing actinic radiation thereby inducing electronic excitation in said oligomer; and b. a prepolymer containing at least one functional group having carbon to carbon unsaturated bonds, which comprises coating an article with a thin film of said mixture and then subjecting said coated article to actinic radiation.

A preferred embodiment of this process aspect of the invention is a process for providing said coated article where said coating is derived from a mixture of compounds of Formula I and of Formula II.

This invention provides in another composition aspect an article of manufacture comprising:
a. a substrate; and
b. a cured coating derived from a mixture comprising an oligomeric prepolymer containing at least one functional group capable of absorbing actinic radiation thereby inducing electronic excitation in said oligomer, and a prepolymer containing at least one functional group having a carbon to carbon unsaturated bond.

DESCRIPTION OF THE PREFERRED EMBODIMENT

The liquid oligomeric prepolymers having at least one functional group capable of absorbing actinic radiation thereby inducing electronic excitation in said oligomer are readily prepared by processes well known to those in the art. Typically these compounds will have polymeric backbones bearing as a substituent a product derived from a hydroxy substituted naphthalene, hydroxy substituted benzophenone, a hydroxy substituted acetophenone, a benzoin or hydroxy ethoxy benzophenone or hydroxy ethoxy acetophenone. Conveniently, reaction between the hydroxy function and a reactive functional group on the polymeric backbone will suffice to prepare the desired oligomer. Typically such reactions as esterification, reaction with an isocyanate group, esterification, or displacement of a halogen atom will be employed. More specifically, one may take a polyester polyol having a molecular weight of between 300 and 3000 and treat it with a functional isocyanate such as toluenediisocyanate, hexamethylene diisocyanate or isophorone diisocyanate and the like, and then treat that product with an equivalent amount of the hydroxy substituted compound which it is desired to couple. One may similarly treat a polyether polyol in the same fashion. Alternatively, a carboxy terminated polyether or polyester may be esterified directly using standard techniques with a hydroxy containing proposed substituent which it is desired to incorporate into the molecule.

A hydroxy terminated prepolymer may also be esterified with one carboxyl function of a di basic carboxylic acid using known techniques and a hydroxy containing substituent which it is proposed to couple may be esterified with the other carboxyl function also using standard techniques. A hydroxy containing substituent which it is desired to incorporate may also be coupled directly to a prepolymer having an active displaceable halogen by the usual methods employed in that type of reaction. The hydroxyl bearing proposed substituent may also be reacted with a epoxide function on the prepolymer to which its attachment is desired. For example, if desired, a hydroxyl terminated polyester of molecular weight about 800 is end capped with toluene diisocyanate to a final NCO content of about 3.0% and then treated with benzoin in the presence of a basic catalyst. The product is benzoin terminated urethane capped polyether.

A similar polyester may, if desired, be esterified with a molar equivalent of a dibasic acid such as adipic acid and the product then treated with benzoin in the presence of a catalyst under normal esterification conditions to produce a benzoin terminated adipic acid end capped polyester. Both these reactions may be run in an inert solvent, the identity of which is not critical as long as it will not interfere with the course of the reaction. The exact time and temperature of the reactions are similarly not critical. The endpoint for esterifications conveniently can be determined by running the reaction at a temperature where water will distill out and the lack of formation of further water will indicate the completeness of ester formation. The isocyanate reaction can be monitored by the remaining isocyanate content of the reaction mixture.

One skilled in the art will recognize that in addition to the specific prepolymers isocyanates, dicarboxylic acids, and benzoin illustrated herein above and in the following examples the other prepolymers, isocyanate, dicarboxylates, benzoins, acetoins, benzophenones, and hydroxy ethyl benzophenones contemplated as equivalents in this invention may be substituted in analogous reactions to produce the other compounds of Formula I.

It will also be obvious to one skilled in the art that hydroxy substituted acrylate esters, or hydroxy containing vinyl ether may be substituted for the benzoin illustrated to obtain the compounds of Formula II through analogous reactions.

It will also be obvious to one skilled in the art that where a prepolymer is functionalized at more than one terminal portion that the reaction can be performed at each of those terminals by proper control of the relative proportions of the reactants so as to end-cap the number of terminal positions desired.

Through control of the relative proportions of the reactions it will also be obvious that molecules of Formula I containing mixtures of the various ultraviolet sensitive end capping moieties may be prepared, and that similarly molecules of Formula II containing mixtures of acrylate ester and/or vinyl ether residues may be prepared.

Similarly, if desired, one may prepare molecules end capped with mixtures of the ultraviolet sensitive end groups and acrylate esters and/or vinyl ether functions. Such molecules will, of course, be self curing upon exposure to radiation of the appropriate wave length.

Typical illustrative prepolymers which may be used for the R function in compounds of Formula I and II are: liquid polyesters derived from such polyhydric alcohols as ethylene glycol, 1,3-propanediol, 1,2-propanediol, 1,3-butanediol, 1,4-butanediol, 2,3-butanediol, 1,3-pentanediol, 1,4-pentanediol, 1,5-pentanediol, 2,3-pentanediol, 2,4-pentanediol, 1,6-hexanediol, 1,5-hexanediol, 1,4-hexanediol, 1,3-hexanediol, 2,3-hexanediol, 2,4-hexanediol, 2,5-hexanediol, 1,7-heptanediol, 1,5-heptanediol, 3,5-heptanediol, 1,10-decanediol, para-xylene glycol, the bis-(B-/hydroxyethylether) of hydroquinone, neopentylglycol, glycerin, pentaerythritol, trimethylol propane, triethylolethane and the like and polycarboxylic acids such as, for example, adipic acid, oxalic acid, succinic acid, methyl adipic acid, sebacic acid, glutaric acid, pimelic acid, azelaic acid, suberic acid, phthalic acid, terephthalic acid, iso-phthalic acid, 1,2,4-benzene tricarboxylic acid, thiodiglycolic acid, thiodipropionic acid, maleic acid, fumaric acid, itaconic acid, citraconic acid and the like, liquid polyamides derived from the reaction between polycarboxylic acids as illustrated hereinabove and polyamines such as, for example, ethylene diamine, propylene diamine, butylene diamines, pentamethylene diamine, hexanethylene diamine, phenylene diamine, tolylene diamine, xylylene diamine, 4,4'-diamino-diphenylmethane, cyclohexylene diamine, naphthylene diamine, and the like, or liquid polyester polyamides from polycarboxylic acids and amino alcohols such as amino ethanol, amino propanol, amino butanol, and the like, also polyesters prepared from lactones such as caprolactone and the like, polyhydric polyalkylene ethers such as, for example, the condensation products of an alkylene oxide such as ethylene oxide, propylene oxide, butylene oxide, amylene oxide and the like with a suitable initiator such as water or any of the polyalcohols, polyamines, or amino alcohols set forth herein, also prepolymers containing urethane linkages may be prepared by treating any of the active hydrogen containing compounds listed hereinabove with polyisocyanates such as, for example, 1-methoxyphenyl-2,4-diisocyanate, 1-methyl-4-methoxyphenyl-2,5-diisocyanate, 1-ethoxyphenyl-2,4-diisocyanate, 1,3-dimethoxyphenyl-4,6-diisocyanate, 1,4-dimethoxyphenyl-2,5-diisocyanate, 1-propoxyphenyl-2,4-diisocyanate, 1-isobutoxy,2,4-diisocyanate, 1,4-diethoxyphenyl-2,5-diisocyanate, toluene-2,4-diisocyanate, toluene-2,6-diisocyanate, diphenylether-2,4-diisocyanate, naphthalene-1,4-diisocyanate, 1,1'-dinaphthalene-2,2'-diisocyanate, biphenyl-2,4-diisocyanate, 3,3'-dimethylbiphenyl-4,4'-diisocyanate, 3,3'-dimethoxybiphenyl-4,4'-diisocyanate, diphenylmethane-4,4'-diisocyanate, diphenylmethane-2,4'-diisocyanate, diphenylmethane-2,2'-diisocyanate, 3,3'-dimethoxy diphenylmethane-4,4'-diisocyanate, benzophenone-3,3'-diisocyanate, ethylene diisocyanate, propylene diisocyanate, butylene diisocyanate, pentylene diisocyanate, methylbutylene diisocyanate, tetramethylene diisocyanate, pentamethylene diisocyanate, hexanethylene diisocyanate, dipropyl diisocyanate ether, heptanethylene diisocyanate, 2,2-dimethylpentylene diisocyanate, 3-methoxy-hexamethylene diisocyanate, octamethylene diisocyanate, 2,2,4-trimethylpentylene diisocyanate, 3-butoxyhexamethylene diisocyanate, 1,3-dimethylbenzene diisocyanate, 1,4-dimethyl benzene diisocyanate, 1,2-dimethylcyclohexane diisocyanate, 1,4-dimethylcyclohexane diisocyanate, 1,4-diethylbenzene diisocyanate, 1,4-dimethylnaphthalene diisocyanate, 1,5-dimethylnaphthalene diisocyanate, cyclohexane-1,3-diisocyanate, cyclohexane-1,4-diisocyanate, 1-methylcyclohexane-2,4-diisocyanate, 1-methylcyclohexane,-2,2-diisocyanate, 1-ethylcyclohexane-2,4-diisocyanate, dicyclohexylmethane-4,4'-diisocyanate, dicyclohexylmethylmethane-4,4'-diisocyanate, dicyclohexyldimethylmethane-4,4'-diisocyanate, 2,2-dimethyldicyclohexylmethane-4,4'-diisocyanate, 3,3',5,5'-tetramethyldicyclohexylmethane-4,4'-diisocyanate, 4,4'-methylenebis(cyclohexylisocyanate), ethylidene diisocyanate, 4,4'-diphenyl diisocyanate, dianisidine diisocyanate, 1,5-naphthalene diisocyanate, m-phenylene diisocyanate, isopropylidene bis (phenyl or cyclohexyl isocyanate), 1,3-cyclopentylene diisocyanate, 1,2-cyclohexylene diisocyanate, 1,4-cyclohexylene diisocyanate, 4,4',4"-triphenylmethane triisocyanate, 1,3,5-triisocyanate benzene, phenylethylene diisocyanate, and the like, also poly silanols derived in the usual fashion from lower alkyl or vinyl silanol and silanes, also polyphospholanes derived in the usual fashion from phosphoxychlorides and polyols and the like also hydroxy terminated polybutenes and polybutadienes and the like.

While the processes for the practice of the invention have been described for the preparation of specific embodiments of the invention having a group capable of absorbing actinic radiation derived from benzoin, it will be obvious to one skilled in the art that in place of benzoin one may substitute other substituted benzoins such as those described in Organic Reactions, Vol IV, Chapter 5, John Wiley, New York, N. Y., or those prepared by the general methods described therein; acetoins as described or prepared by the methods set forth in the same volume of Organic Reactions, referenced above; hydroxyalkoxy substituted benzophenones, or hydroxy alkoxy substituted acetophenones, as described in Vol. I of Organic Reactions, John Wiley, New York, N. Y.; hydroxy alkoxy acetonaphthanes or hydroxy alkoxy anthraquinones.

Similarly one skilled in the art would recognize that in place of benzoin at one or more terminal positions one could substitute an hydroxy substituted acrylic ester or an isopropylidene hydroxy derivative to prepare the compounds of Formula II.

In using the compositions of the invention one may employ the standard procedures normally employed when using radiation curable polymers.

The photoinitiator prepolymer and the photocurable polymer are blended by conventional methods, if necessary. If the photoinitiator function, and the photocurable function are both contained in the same prepolymer, of course, such blending would not be necessary, but additional photocurable prepolymer may be added if desired.

Various optional additives such as plasticizers, solvents and flow control agents may also be incorporated in the final formulation. The photoinitiator prepolymer may be incorporated at about 5 to about 25 parts per hundred commonly from 10 to about 20 parts per hundred most preferably about 15 parts per hundred of the final formulation weight. The photocurable prepolymer may be incorporated at about 30 to 95 parts per hundred commonly about 40 to 70 parts per hundred, preferably about 50 parts per hundred of the final formulation when a separate photoinitiator of photocurable prepolymer is employed. When a combination photocurable, photoinitiator prepolymer is employed it may be employed at from about 30 to about 80 parts per hundred, commonly about 40 to 70 parts per hundred, preferably about 50 to 60 parts per hundred of the final formulation and up to about 25% additional photocurable prepolymer containing no photoinitiator function on the same molecule may be incorporated.

The blended material may then be cast as a film over the surface it is desired to coat and then the coated surface exposed to actinic radiation in the range from 2000 to 4000 Å preferably from about 3000 to 4000 Å. The exact time of exposure is not critical, and will depend somewhat, of course, on the intensity of the radiation incident on the surface, and will be sufficient to allow the formation of a cured film which phenomenon will be readily observable.

The following Examples further illustrate the best mode contemplated by the inventor for the practice of his invention.

EXAMPLE 1

This Example illustrates the preparation of a benzoin end-capped urethane terminated polyester.

To a mixture of hydroxyl terminated polyethylene adipate having an average molecular weight of about 800 end capped with toluene diisocyanate to a final—NCO content of about 3.0 (623.8 g), benzoin (100.3 g) and methyl ethyl ketone (482.7 g) was added triethylamine (1.4 g). The mixture was heated with stirring to 60° C., after 3 hours the NCO content had dropped from 3.1 to 0.1%.

EXAMPLE 2

This Example illustrates the use of the product of Example 1 as an initiator in a photocure reaction.

A ten mil film was cast from a mixture of 15 parts of the product of Example 1 and 50 parts of an acrylate terminated oligomer obtained by capping an isocyanate terminated polyethylene adipate prepolymer containing 1.65% NCO with 2-hydroxyethylacrylate. The film was then subjected to ultraviolet radiation using a QC 1202 AN Processor (P. P. G. Industries Inc. Radiation Polymer Co.) at a conveyor speed of 20 feet per minute under two 12 inch lamps having a linear power density of 200 watts per inch. A flexible cured film having an ultimate tensile strength of 1720 psi and an elongation of 270% was obtained.

EXAMPLE 3

This Example further illustrates the use of a benzoin end-capped, toluene diisocyanate terminated poly(ethylene)adipate as a photoinitiator.

A. A hydroxy terminated poly(ethylene)adipate of average molecular weight about 1600 was end-capped with toluene diisocyanate (Hylene TM) at an NCO/OH ratio of 1.67 and then with benzoin at an OH/NCO ratio of 1.05 in methyl ethyl ketone (60% solids) in a fashion similar to that described in Example 1.

B. 15.1 parts of the product of part A are mixed with 83.9 parts of an acrylate terminated oligomer prepared by end-capping with 2-hydroxy ethyl acrylate at an OH/NCO ratio of 1.05, an ethylene/propylene adipate copolymer of average about 2500 molecular weight end-capped with Hylene TM to an approximate NCO content of 1.65%, and 1 part of an organo modified silicone UCC L-7602 as a flow control agent. A 17 mil film was cast from this mixture allowed to air dry overnight then samples were ultraviolet cured as in Example 2 at 20(A), 40(B), and 60(C) feet per minute.

The following physical properties were obtained.

| Sample | Tensile (psi) | Elongation |
|---|---|---|
| A | 1720 | 200 |
| B | 760 | 210 |
| C | 610 | 205 |

EXAMPLE 4

A radiation curable oligomer as described in Example 3 (53.7 parts), an oligomeric initiator as described in Example 3 (15.1 parts), UCCL-7602 (1 part) and 1,6-hexanediol diacrylate (30.2 parts) are blended. A 15 mil thickness film is cast and allowed to air dry overnight. Samples are treated with ultraviolet radiation as described in Example 2 at speed of 20(A), 40(B) and 60(C) feet per minute. The following physical properties were obtained:

| Sample | Tensile (psi) | Elongation (%) |
|---|---|---|
| A | 1300 | 30 |
| B | 1010 | 25 |
| C | 740 | 25 |

EXAMPLE 5

A radiation curable oligomer as described in Example 3 (50 parts), an oligomeric initiator as described in Example 3 (15 parts), methyl ethyl ketone (33 parts) and UCCL-7602 (0.6 parts) are blended. A 17 mil film was cast of this blend, air dried overnight and samples ultraviolet cured at 20 feet per minute.

The following physical properties were obtained:
Tensile 995 psi
Elongation: 175%
100% Modulus: 245

EXAMPLE 6

A radiation curable oligomer prepared by end-capping with 2-hydroxy ethyl acrylate, a hydroxyl terminated polyoxy propylene glycol of 987 average molecular weight capped with Hylene TM at an NCO/OH ratio of 2.0 (44.8 parts), an oligomeric initiator prepared by end-capping with benzoin at an OH/NCO ratio of 1.05, a polyoxy propylene glycol of 1865 average molecular weight capped with Hylene TM at an NCO/OH ratio of 2.0 60% solids in methyl ethyl ketone (10.3 parts), methyl ethyl ketone (23.9 parts) and UCCL-7602 (0.6 parts) were blended. A 17 mil film was cast and air dried overnight. A sample was ultraviolet cured as in Example 2.

The following physical properties were obtained:
Tensile: 150 psi
Elongation: 20%

EXAMPLE 7

A photocurable oligomer prepared by end-capping with 2-hydroxy ethyl acrylate, a hydroxy terminated poly(ethylene adipate) of about 1600 average molecular weight end-capped with Hylene TM at an NCO/OH ratio of 1.67 (17.8 parts), a photoinitiator prepared by end-capping an ethylene/propylene adipate copolymer of about 2500 average molecular weight with Hylene TM to an approximate NCO content of 1.65% then treating with benzoin (0.4 OH/NCO ratio) followed by treating with 2-hydroxy ethyl acrylate (0.65 OH/NCO ratio) (55.3 parts), methyl ethyl ketone (11.9 parts), and UCCL-7602 (0.5 parts) were blended. A 17 mil film was cast and air dried overnight. After ultraviolet cure at 20 feet per minute as in Example 2 the following physical properties were obtained:
Tensile: 360 psi
Elongation: 230%
Modulus: 100% 80
200% 120

EXAMPLE 8

A photocurable oligomer as in Example 6 (40.8 parts), an oligomer initiator prepared by end-capping a polyoxy propylene glycol of 1025 average molecular weight with Hylene TM at an NCO/OH ratio of 2.0 followed by end-capping with 0.9 equivalent of benzoin and 0.1 equivalent of diethyleneglycol monobutyl ether as 72.8% solids in methyl ethyl ketone (12.7 parts), methyl ethyl ketone (18 parts), UCCL-7602 (0.5 parts) were blended. A 14 mil film was cast and allowed to air dry overnight. After ultraviolet curing as in Example 2 at 20 feet per minute the following physical properties were found:
Tensile: 460 psi
Elongation: 50%

EXAMPLE 9

A photocurable oligomer analogous to that of Example 3 (23.9 parts), a photoinitiator prepared by end-capping a poly(ethylene adipate) of 1290 average molecular weight with Hylene TM at an NCO/OH ratio of 1.82 followed by treating with benzoin (0.4 equivalents) and 2-hydroxy ethyl acrylate (0.6 equivalents) as 50% solids in methyl ethyl ketone (52.3 parts), methyl ethyl ketone (7 parts), and UCCL-7602 (0.5 parts) were blended. A 17 mil film was cast and air dried overnight. After ultraviolet cure as in Example 2 at 20 feet per minute the following physical properties are found:
Tensile: 285 psi
Elongation: 90%

EXAMPLE 10

A radiation curable oligomer as in Example 6 (40.8 parts), a photoinitiator prepared by end-capping a polyoxy propylene glycol of 1025 average molecular weight with Hylene TM at an NCO/OH ratio of 2.0 followed by capping with benzoin (0.9 equivalent) and isopropylidene glycerol (0.1 equivalent) as 72% solids in methyl ethyl ketone (12.8 parts), methyl ethyl ketone (18 parts) and UCCL-7602 (0.5 parts) were blended. A 14 mil film was cast and air dried overnight. Ultraviolet cure as in Example 2 at 20 feet per minute gave the following physical properties:
Tensile: 410 psi
Elongation: 40%
Modulus: 100% 220

EXAMPLE 11

A photocurable oligomer as in Example 6 (40.2 parts), a photoinitiator prepared by end-capping a polyoxy propylene glycol of 1025 average molecular weight with Hylene TM at an NCO/OH ratio of 2.0 followed by capping with benzoin (0.4 equivalents), and 2-hydroxy ethyl acrylate (0.6 equivalents) as 50% solids in methyl ethyl ketone (19.5 parts), methyl ethyl ketone (12 parts) and UCCL-7602 (0.5 parts) were blended. A 14 mil film was cast and let dry overnight. Ultraviolet cure as in Example 2 at 20 feet per minute gave the following physical properties:
Tensile: 545 psi
Elongation: 40%
Modulus: 100% 340

EXAMPLE 12

A radiation curable oligomer analogous to that of Example 3 (50 parts), a photoinitiator as in Example 3 (15 parts), methyl ethyl ketone (33 parts), and UCCL-7602 (0.6 parts) were blended. A 17 mil film was cast and air dried overnight. Ultraviolet curing as in Example 2 at 20 feet per minute gave the following physical properties:
Tensile: 2350 psi
Elongation: 295%
Modulus: 100% 200
200% 910

EXAMPLE 13

A photocurable oligomer Epocryl DRH 303.1 (an acrylated bisphenol A epoxy resin unsaturation 0.356 equivalents/100 g, Shell Chemical Co.) (52.3 parts), a photoinitiator as in Example 3 (12.9 parts), methyl ethyl ketone (35 parts), and UCCL-7602 (0.6 parts) were blended. A 17 mil film was cast and air dried overnight. The film was ultraviolet cured as in Example 2 at 20 feet per minute.

EXAMPLE 14

A radiation curable oligomer analogous to that of Example 3 (50 parts), a photoinitiator as in Example 3 (15 parts), methyl ethyl ketone (33 parts), and UCCL- 7602 were blended. A 17 mil film was cast and air dried overnight. Ultraviolet cure as in Example 2 at 20 feet per minute gave the following physical properties:

Tensile: 2170 psi
Elongation: 315%
Modulus: 100% 180
    200% 85
    250% 950

The subject matter which Applicant regards as his invention is particularly pointed out and distinctly claimed as follows:

1. The product obtained by treating a hydroxyl terminated poly(ethylene adipate) of molecular weight 800 endcapped with toluene diisocyanate to a final isocyanate content of about 3.0 with about a stoichiometric equivalent of benzoin at about 60° C.

2. The product obtained by treating a hydroxyl terminated poly(ethylene adipate) of molecular weight about 1600 endcapped with toluene diisocyanate at an NCO-/OH ratio of 1.67 with benzoin at an NCO/OH ratio of 1.05 at about 60° C.

3. The product obtained by treating a poly (oxypropylene) glycol of 987 molecular weight endcapped with toluene diisocyanate at an NCO/OH ratio of 2.0 with benzoin at an OH/NCO ratio of 1.05.

4. The product obtained by treating a poly(oxypropylene) glycol of 1025 molecular weight endcapped with toluene diisocyanate at an NCO/OH ratio of 2.0 with 0.9 equivalents of benzoin and 0.1 equivalent of diethylene glycol monobutyl ether.

* * * * *

UNITED STATES PATENT OFFICE
CERTIFICATE OF CORRECTION

Patent No. 4,200,762               Dated  April 29, 1980

Inventor(s)   Claude J. Schmidle

It is certified that error appears in the above-identified patent and that said Letters Patent are hereby corrected as shown below:

Column 4, line 30 "functional" should read --difunctional--.
Column 5, line 49 "bis-(B-/hydroxye-" should read --bis-(B-hydroxye- --.
Column 8, line 46 following Example 3 should read --As used herein and in the following Examples all parts are by weight.--.

Signed and Sealed this

Twelfth Day of August 1980

[SEAL]

*Attest:*

SIDNEY A. DIAMOND

*Attesting Officer*   *Commissioner of Patents and Trademarks*